(12) United States Patent
Robinson et al.

(10) Patent No.: US 10,897,570 B1
(45) Date of Patent: Jan. 19, 2021

(54) ROOM ACOUSTIC MATCHING USING SENSORS ON HEADSET

(71) Applicant: Facebook Technologies, LLC, Menlo Park, CA (US)

(72) Inventors: Philip Robinson, Seattle, WA (US); Scott Colburn, Redmond, WA (US); William Owen Brimijoin, II, Kirkland, WA (US); Vamsi Krishna Ithapu, Kirkland, WA (US); Peter Harty Dodds, Seattle, WA (US); Sebastiá Vicenç Amengual Gari, Seattle, WA (US); Carl Schissler, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 67 days.

(21) Appl. No.: 16/259,990

(22) Filed: Jan. 28, 2019

(51) Int. Cl.
| | |
|---|---|
| *H04N 5/232* | (2006.01) |
| *G06T 7/50* | (2017.01) |
| *G06N 3/02* | (2006.01) |
| *G06K 9/32* | (2006.01) |
| *G06T 7/70* | (2017.01) |
| *G06K 9/00* | (2006.01) |

(52) U.S. Cl.
CPC ..... *H04N 5/23229* (2013.01); *G06K 9/00691* (2013.01); *G06K 9/3241* (2013.01); *G06N 3/02* (2013.01); *G06T 7/50* (2017.01); *G06T 7/70* (2017.01)

(58) Field of Classification Search
CPC ........ H04N 5/23229; G06N 3/02; G06T 7/50; G06T 7/70; G06K 9/3241; G06K 9/00691
See application file for complete search history.

(56) References Cited

U.S. PATENT DOCUMENTS

| 9,942,687 | B1 | 4/2018 | Chemistruck et al. |
| 10,206,055 | B1 | 2/2019 | Mindlin et al. |
| 10,602,298 | B2 * | 3/2020 | Raghuvanshi .......... H04S 7/305 |

(Continued)

FOREIGN PATENT DOCUMENTS

| WO | WO 2016/014254 A1 | 1/2016 |
| WO | WO 2018/182274 A1 | 10/2018 |
| WO | WO 2019/079523 A1 | 4/2019 |

OTHER PUBLICATIONS

Brandenburg, K., et al. "Plausible Augmentation of Auditory Scenes Using Dynamic Binaural Synthesis for Personalized Auditory Realities." Audio Engineering Society Conference, 2018, pp. 1-10.

(Continued)

*Primary Examiner* — Neil R McLean
(74) *Attorney, Agent, or Firm* — Fenwick & West LLP

(57) ABSTRACT

A system generates an output audio signal for an object or virtual object using image data of a room to select a room impulse response from a database. A headset may include a depth camera assembly (DCA) and processing circuitry. The DCA generates depth image data of a room. The processing circuitry determines room parameters such as the dimensions of the room based on the depth image data. A room impulse response for the room is determined based on referencing a database of room impulse responses using the room parameters. An output audio signal is generated by convolving a source audio signal of an object with the room impulse response.

16 Claims, 7 Drawing Sheets

(56) References Cited

U.S. PATENT DOCUMENTS

| | | |
|---|---|---|
| 2011/0069841 A1* | 3/2011 | Angeloff ................ H04S 7/303 |
| | | 381/17 |
| 2012/0093320 A1 | 4/2012 | Flaks et al. |
| 2012/0206452 A1 | 8/2012 | Geisner et al. |
| 2013/0041648 A1* | 2/2013 | Osman .................... H04S 7/302 |
| | | 704/2 |
| 2013/0236040 A1 | 9/2013 | Crawford et al. |
| 2017/0223478 A1 | 8/2017 | Jot et al. |
| 2017/0316115 A1* | 11/2017 | Lewis ....................... G06T 7/55 |
| 2019/0116448 A1* | 4/2019 | Schmidt ................ G06F 3/011 |
| 2020/0037091 A1 | 1/2020 | Jeon et al. |

OTHER PUBLICATIONS

Plinge, A., et al. "Six-Degrees-of-Freedom Binaural Audio Reproduction of First-Order Ambisonics with Distance Information," Audio Engineering Society Conference, 2018, pp. 1-10.

Traer, J. et al., "Statistics of natural reverberation enable perceptual separation of sound and space," Proceedings of the National Academy of Sciences, 2016, vol. 113, No. 48, pp. E7856-E7865.

United States Office Action, U.S. Appl. No. 16/366,484, dated Nov. 14, 2019, 11 pages.

PCT International Search Report and Written Opinion, PCT Application No. PCT/US2020/023071, dated Jul. 3, 2020, 15 pages.

* cited by examiner

| Reference Room ID 262 | Room Impulse Response 252 | Dimensions 254 | Material 256 | Room Type 258 | Object 260 |
|---|---|---|---|---|---|
| R1 | ... | L1, W1, H1 | Wood | Conference Room | Table, Chair |
| R2 | ... | L2, W2, H2 | Concrete | Living Room | Sofa, Televsion |
| R3 | ... | L3, W3, H3 | Plaster | Hallway | Toilet |
| R4 | ... | L4, W4, H4 | Carpet | Office | Table |

ROOM ACOUSTIC MATCHING USING SENSORS ON HEADSET

BACKGROUND

This disclosure relates to determining room acoustic parameters (e.g., a room impulse response), and specifically relates to determining room acoustic parameters using image data, room geometry, and audio data.

A sound perceived at the ears of two users can be different, depending on a direction and a location of a sound source with respect to each user as well as on the surroundings of a room in which the sound is perceived. Humans can determine a location of the sound source by comparing the sound perceived at each set of ears. In an artificial reality environment, simulating sound propagation from an object to a listener may use knowledge about the acoustic parameters of the room, for example a reverberation time or the direction of incidence of the strongest early reflections. One technique for determining the acoustic parameters of a room includes placing a loudspeaker in a desired source location, playing a controlled test signal, and de-convolving the test signal from what is recorded at a listener location. However, such a technique generally requires a measurement laboratory or dedicated equipment in-situ.

SUMMARY

Embodiments relate to using image, geometry, and audio data of a room to select an appropriate room impulse response from a database of reference rooms and associated room impulse responses. The room impulse response is used to generate an output audio signal that simulates sound propagation within the room from a target position of an (e.g., virtual) object to a position of a headset worn by a user. Some embodiments include a headset including a depth camera assembly (DCA) and processing circuitry. The DCA generates depth image data of a room. The processing circuitry determines dimensions of the room based on the depth image data; determines a room impulse response for the room based on referencing a database of room impulses responses using the dimensions; and generates an output audio signal by convolving a source audio signal of an object with the room impulse response.

Some embodiments include a method performed by a processing circuitry. The method includes: determining dimensions of a room based on depth image data from a depth camera assembly (DCA) of a headset; determining a room impulse response for the room based on referencing a database of room impulses responses using the dimensions; and generating an output audio signal by convolving a source audio signal of an object with the room impulse response.

Some embodiments include a system. The system includes a headset and a storage device. The headset includes: a depth camera assembly (DCA) configured to generate depth image data of a room; and processing circuitry configured to: determine dimensions of the room based on the depth image data; determine a room impulse response for the room based on referencing a database of room impulses responses using the dimensions; and generate an output audio signal by convolving a source audio signal of an object with the room impulse response. The storage device is configured to store the database of room impulse responses, each of the room impulse responses associated with room parameters defining properties of a reference room within the database.

The figures depict various embodiments of the present disclosure for purposes of illustration only. One skilled in the art will readily recognize from the following discussion that alternative embodiments of the structures and methods illustrated herein may be employed without departing from the principles, or benefits touted, of the disclosure described herein.

DETAILED DESCRIPTION

Configuration Overview

Image, geometry, and audio data of a room is used to select an appropriate room impulse response from a database. The room impulse response is used to transform an audio signal associated with an object or virtual object to simulate propagation of sound from the object to a position of a listener within the room. The database stores a representative sample of reference rooms and their room impulse responses. Each room impulse response is associated with room parameters defining properties of a reference room within the database. The image data of the room is used to determine room parameters of the room, which are used to reference the database and retrieve a room impulse response. Advantageously, a reasonably sized database can provide a sufficient match of room impulse response for most rooms encountered in day-to-day experience, and does not require computationally intensive acoustic simulations or audio sampling within the room.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset connected to a host computer system, a standalone headset, a mobile device or computing system, or any other hardware platform capable of providing artificial reality content to one or more viewers.

Example System

Figure 1:
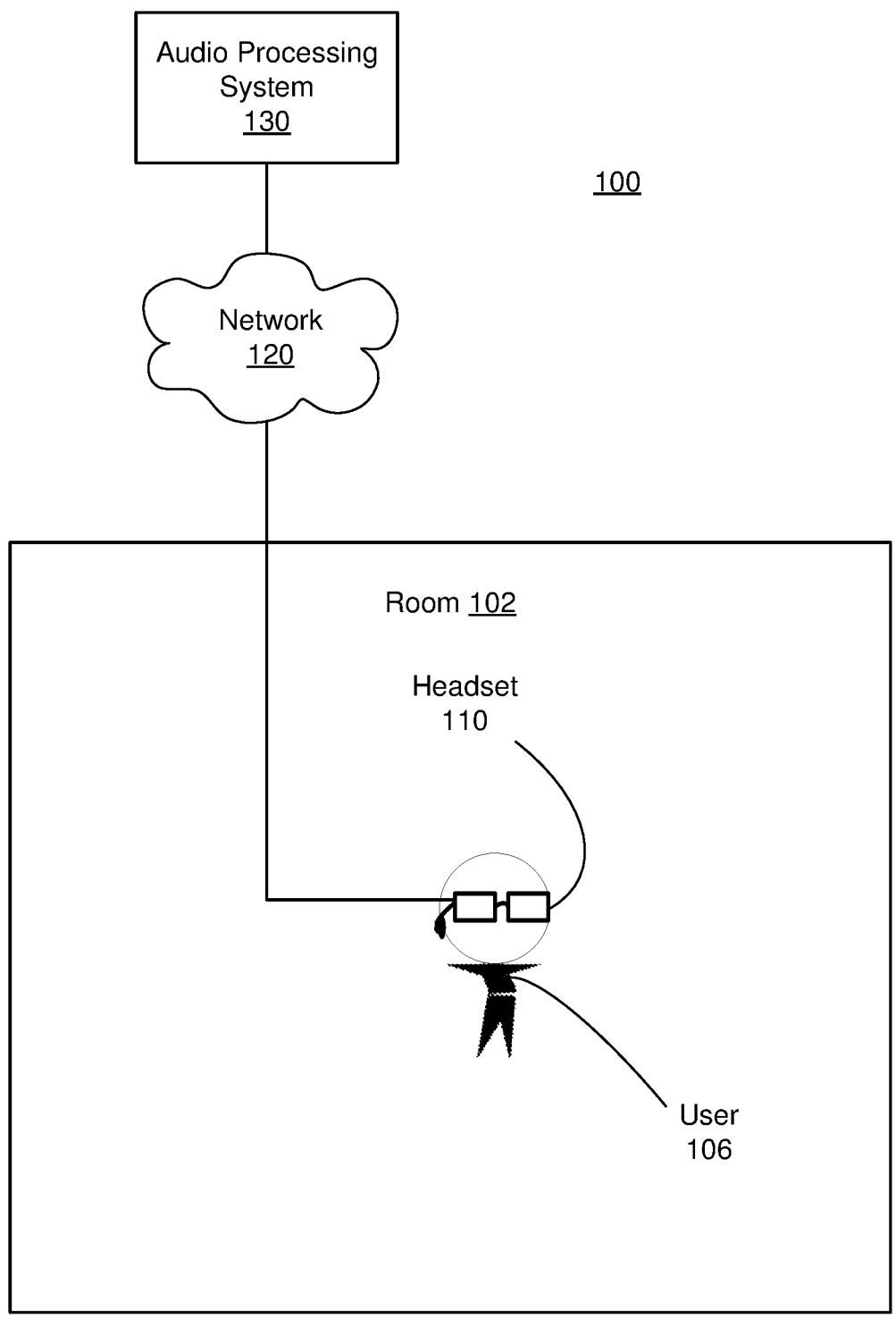
FIG. 1 is a block diagram of a system environment for a headset, according to some embodiments.

FIG. 1 is a block diagram of a system 100 for a headset 110, according to some embodiments. The system 100 includes the headset 110 that can be worn by a user 106 in a room 102. The headset 110 is connected to an audio processing system 130 via a network 120.

The network 120 connects the headset 110 to the audio processing system 130. The network 120 may include any combination of local area and/or wide area networks using both wireless and/or wired communication systems. For example, the network 120 may include the Internet, as well as mobile telephone networks. In one embodiment, the network 120 uses standard communications technologies and/or protocols. Hence, the network 120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The headset 110 presents media to a user. In one embodiment, the headset 110 may be a near-eye display (NED). In another embodiment, the headset 110 may be a head-mounted display (HMD). In general, the headset 110 may be worn on the face of a user such that content (e.g., media content) is presented using one or both lens of the headset. However, the headset 110 may also be used such that media content is presented to a user in a different manner. Examples of media content presented by the headset 110 include one or more images, video, audio, or some combination thereof.

The headset 110 may provide for simultaneous localization for the position of the headset 110 and updating of a model of the room 102. For example, the headset 110 may include a depth camera assembly (DCA) that generates depth image data and a passive camera assembly (PCA) that generates color image data. The image data captured by the DCA and PCA are used to determine room parameters of the room, or to generate a model of the room. Furthermore, the headset 110 may include position sensors or an inertial measurement unit (IMU) that tracks the position (e.g., location and pose) of the headset 110 within the room. Additional details regarding the components of the headset 110 are discussed below in connection with FIGS. 5 and 6.

The audio processing system 130 facilitates the creation of audio output for the headset 110. For example, the audio processing system 130 receives room parameters of the room 102 from the headset 110, and determines a room impulse response or other acoustic parameters of the room by referencing a room impulse response database using the room parameters. An output audio signal may be generated by modifying a source audio signal using the room impulse response to simulate propagation of sound within the room 102 from the source location to the position of the headset 110. The audio processing system 130 may provide the acoustic parameters to the headset 110 to generate the output audio signal, or may generate the output audio signal using the acoustic parameters and provide the output audio signal to headset 110 for rendering.

In some embodiments, the audio processing system 130 includes one or more servers and databases that are connected to the headset 110 via the network 120. In some embodiments, some or all of the components of the audio processing system 130 may be integrated with the headset 110, or another device (e.g., a console) connected to the headset 110.

Figures 2A, 2B:
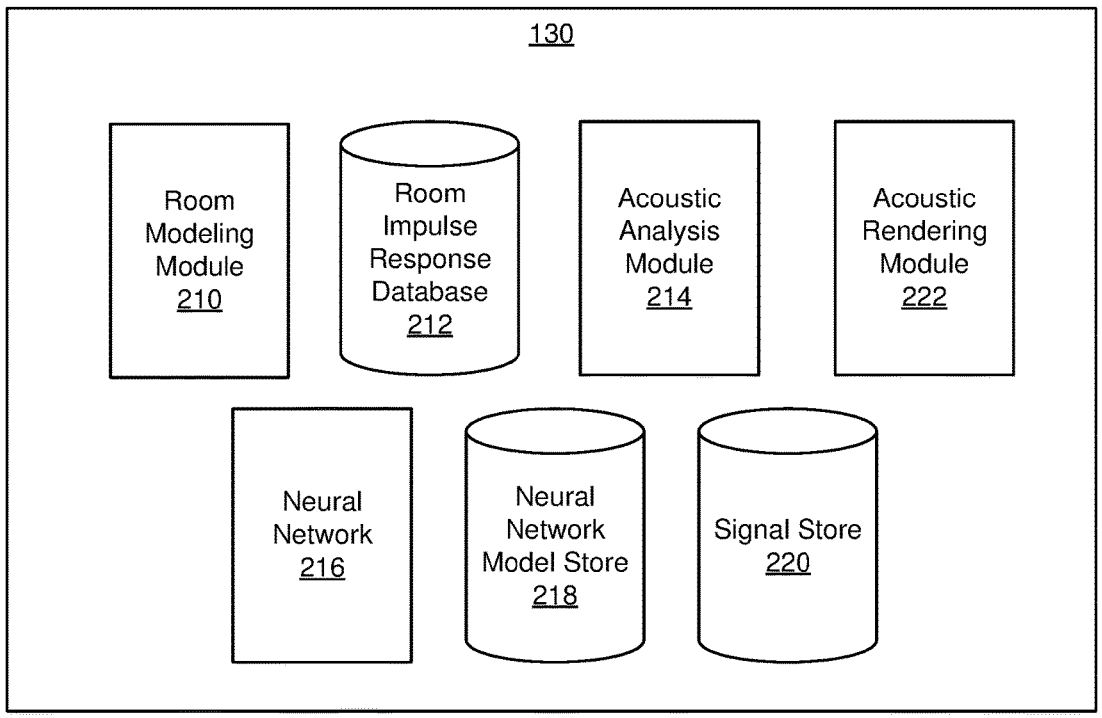
FIG. 2A is a block diagram of an audio processing system, according to some embodiments.
FIG. 2B is an example of a room impulse response table of a room impulse response database, according to some embodiments.

FIG. 2A is a block diagram of the audio processing system 130, according to some embodiments. The audio processing system 130 determines a room impulse response or other acoustic parameters for a room that can be used to transform an audio signal associated with an object or virtual object in the room. To add a convincing virtual sound source to the object, the audio that is output from the headset 110 should sound like it has propagated from its location to the listener in the same way that a natural source in the same position would. The room impulse response defines a transformation caused by the propagation of sound from the object within the room to the listener (e.g., the position of the headset within the room), including propagation along a direct path and various reflection paths off surfaces of the room. The audio processing system 130 includes a room modeling module 210, room impulse response database 212, an acoustic analysis module 214, one or more neural networks 216, a neural network model store 218, and a signal store 220.

The room modeling module 210 generates and updates a model of the room based on image data. For example, the room modeling module 210 receives depth image data captured by the DCA of the headset 110, and uses the depth image data to determine the dimensions and geometry of the room in the model. The dimensions of the room may be defined by surfaces, such as surfaces of the walls, floor, and ceiling of the room. The room modeling module 210 receives color image data captured by the PCA, and uses the color image data to associate materials with the surfaces of the room. In some embodiments, the model of the room may further include objects located in the room. The objects may also include surfaces with associated materials and acoustic absorptions.

To generate the model of the room, the room modeling module 210 may generate a depth map using the depth image data generated by the DCA. The depth map for a frame of depth image data may include depth values. The room modeling module 210 uses the color image data to locate the depth map in a model of the room, and combines depth maps from multiple depth image data frames into a single depth map for the model of the room. The model of the room may then be texturized using, e.g., the color image data from the PCA. In some embodiments, the model of the room may be used to render content for the headset 110 in connection with being used to determine acoustic parameters. The room modeling module 210 may also extract room parameters from the model of the room.

In some embodiments, the room modeling module 210 performs simultaneous localization for the position of the headset 110 and updating of the model of the room using the image data captured by the DCA and PCA of the headset 110. Additional details regarding creation of a model from image data and simultaneous localization and mapping, applicable in some embodiments, are discussed in U.S. patent application Ser. No. 16/054,598, titled "3-D Head Mounted Display Based Environmental Modeling System," filed Aug. 3, 2018, which is incorporated by reference in its entirety.

The room impulse response database 212 stores room impulse response responses of reference rooms that are referenced by the acoustic analysis module 214 using the room parameters from the room modeling module 210. The room impulse response database 212 may include a representative set of room impulse responses. For each reference room, the room impulse response database 212 stores a room impulse response. Each room impulse response is associated with room parameters defining properties of a reference room. Some examples of room parameters for a reference room may include one or more dimensions (e.g., length, width, height) of the reference room, room type of the reference room, one or more materials (e.g. wood, concrete, plaster, carpet, etc.) included in the reference room, or one or more objects (e.g., desk, table, chair, sofa, bed, television, toilet, etc.) located in the reference room. The room impulse responses may be encoded in various audio formats. For example, the room impulses responses may include multi-channel room impulse responses, binaural room impulse responses, or spatial room impulse responses, among others. The room impulse response database 212 may include one or more room impulse responses for each reference room. In some embodiments, room impulse responses of different audio formats may be stored for each reference room.

The acoustic analysis module 214 determines a room impulse response or other acoustic parameters for a room based referencing the room impulse response database 212 using the room parameters. The acoustic analysis module 214 receives the model of the room or the room parameters extracted from the model from the room modeling module 210. Rather than computing a room impulse response (e.g., such as by using a simulation of sound propagation using a model of the room), the acoustic analysis module 214 references the room impulse response database 212 using the room parameters, and retrieves a room impulse response from the room impulse response database 212.

The acoustic rendering module 222 generates an output audio signal for the headset 110 based on the room impulse response to simulate propagation of sound according to the acoustic parameters of the room. For example, the room impulse response retrieved from the room impulse response database 212 may define a single source to receiver relationship. In order to utilize the retrieved room impulse response for other source and receiver locations, the acoustic rendering module 222 updates the room impulse response based on a target position of the (e.g., source) object and a position of the headset 110 (e.g., receiver). Updating the room impulse response may be based on the listener's head pose, the direction and amplitude of direct sound, and the direction and amplitude of early reflections.

In some embodiments, the acoustic rendering module 222 generates the output audio signal for the headset 110 based on other acoustic parameters such as reverberation time or direct to reverberation ratio. These acoustic parameters may also be stored in the room impulse response database 212 with associated room parameters, and may be retrieved by the acoustic analysis module 214 from the database using the room parameters.

The neural network 216 and neural network model store 219 may be used to determine room parameters such as a material included in the room, a room type, or an object located in the room. The neural network model store 218 stores a trained neural network model including neural network layers, layer connections, and kernels that define algorithmic relationships between appearance of surfaces, defined by the image data received from the headset 110, and acoustic absorptions of the surfaces. The neural network 216 includes processing circuitry that implements the neural network model stored in the neural network model store 218. The neural network 216 may include a graphical processing unit (GPU) or an application-specific integrated circuit (ASIC) that is optimized to implement the neural network model.

The audio system 130 may include one or more different neural networks. In some embodiments, a neural network 216 determines one or more materials within the room using image data. For example, the neural network model may define relationships between the image data and materials in a room. The material may include a material of a wall of the room, or the material of an object. Sound may attenuate differently when reflected by different types of materials, and thus the material in the room affects the room impulse response. Each material in the room has its own absorption properties, which vary with acoustic frequency. The weighted average of acoustic absorptions of the surfaces influences the overall reverberation time of the room, and the specific spatial arrangement of surfaces and materials affect other properties of the room acoustics. In some cases, materials may have a distinct visual appearance, which is correlated with its acoustic performance (e.g., brick, glass, acoustic ceiling tile, etc.). Using machine learning techniques implemented by the neural network 216, (e.g., video) frames of the image data may be analyzed to extract the acoustic parameters based on appearance.

In some embodiments, a neural network 216 determines a room type of the room based on dimensions of the room and materials of the room. Here, the neural network model may define algorithmic relationships between room dimensions and materials in a room with room types. In some embodiments, other room parameters may be used as inputs to the neural network 216 to determine the room type such as objects in the room, the material of the objects, the volume of the room, etc. Types or categories of rooms may commonly share various characteristics such as dimensions, materials, or objects, and thus the type of room can affect the room impulse response.

The signal store 220 stores reference audio signals that may be used to generate measured room impulse responses. The measured room impulse responses may be used to modify a room impulse response in the room impulse response database 212, or as a room parameter to look up a room impulse response from the room impulse response database 212.

The components of the audio processing system 130 may be on the same computing device, or in separate devices. In some embodiments, the room modeling module 210 and the audio rendering module 220 are located in the headset 110 or a console connected to the headset 110, while the acoustic analysis module 214 is located in a remote system. In other embodiments, each of the room modeling module 210, acoustic analysis module 214, and audio rendering module 220 are located in the headset 110.

FIG. 2B is an example of a room impulse response table 250 of a room impulse response database 212, according to some embodiments. The room impulse response table 250 includes a listing of reference rooms identified by a reference room ID 262. For each reference room, the room impulse response table 250 associates a room impulse response 252 with room parameters such as dimensions 254, material 256, room type 258, and object 260. The dimensions 254 room parameter defines a length, width, and height of the reference room. In some embodiments, a volume of the reference room may be additionally or alternatively used as a room parameter. The material 256 room parameter defines materials in the room. Some examples of materials include wood, concrete, plaster, carpet, etc. The room type 256 room parameter defines categories of reference rooms. Example room types may include a conference room, a bathroom, a hallway, an office, a bedroom, a dining room, or a living room. The object 258 room parameter defines objects in the reference room. Some examples of an object may include a table, chair, sofa, bed, television, toilet, etc. In some embodiments, one or more of the room parameters used to reference the room impulse response database 212 may be determined from a model of the room generated from image data.

More or fewer types of room parameters may be used to define reference room configurations in the impulse response database 212. In some embodiments, only the dimensions of the room are used as a room parameter. In other embodiments, the dimensions and materials may be used as room parameters.

Figure 3:
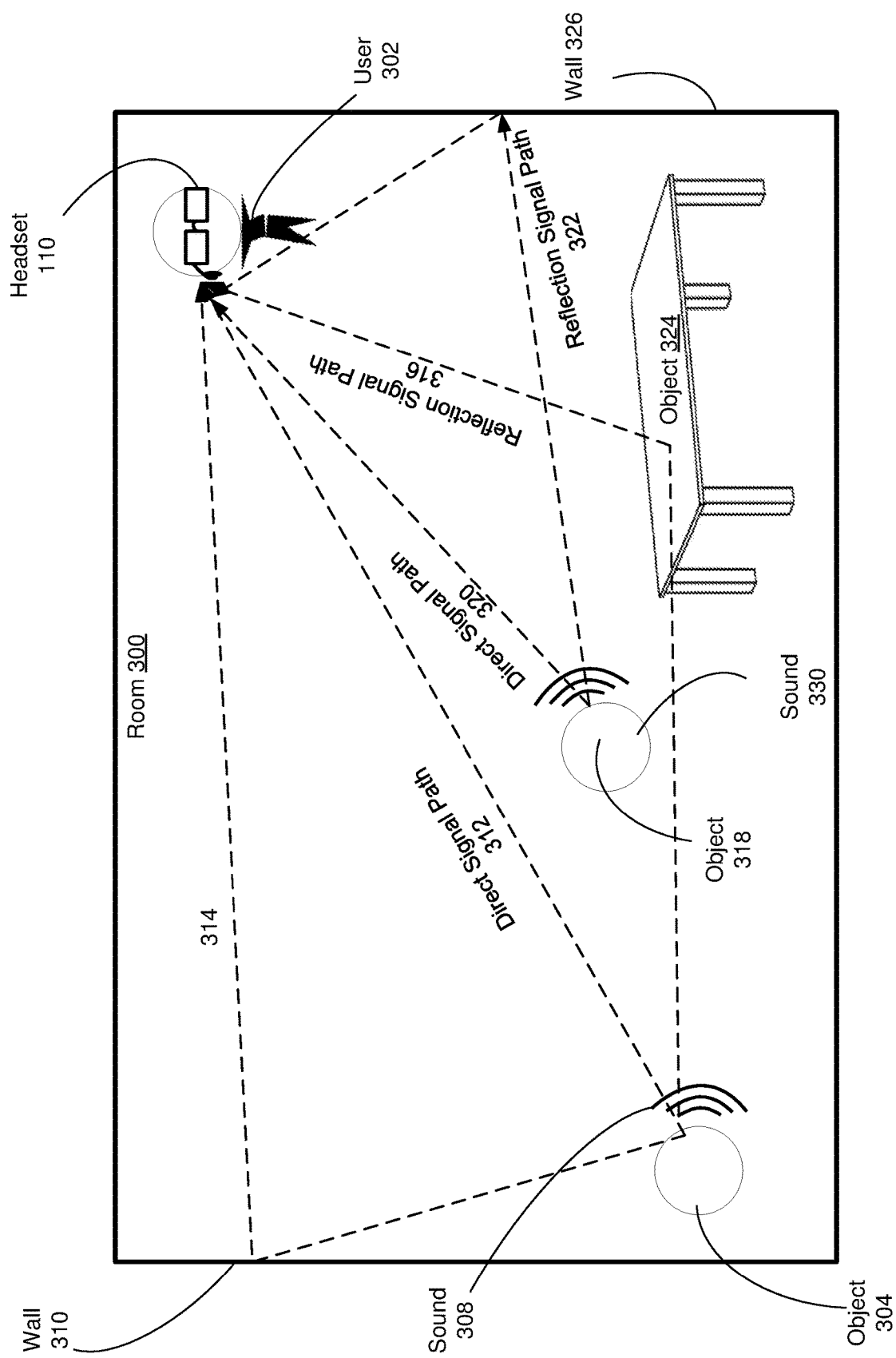
FIG. 3 illustrates the effects of surfaces in a room on the propagation of sound between objects and a user, according to some embodiments.

FIG. 3 illustrates the effects of surfaces in a room on the propagation of sound between objects and a user, according to some embodiments. The room impulse response for the room 300 represents how a sound is transformed when traveling in the room from a source to a receiver, and may include the effects of direct signal paths and reflection signal paths traversed by the sound. For example, a user 302 wearing a headset 110 is located in a room 300. The room includes walls, such as walls 310 and 326, which provide surfaces for reflecting sound 308 from an object 304. When the object 304 emits the sound 308, the sound 308 travels to the headset 110 through multiple paths. Some of the sound 308 travels along a direct signal path 312 to the (e.g., right) ear of the user 302 without reflection. The direct signal path 312 may result in an attenuation, filtering, and time delay of the sound caused by the propagation medium (e.g., air) for the distance between the object 304 and the user 302. Other portions of the sound are reflected, and represent reflection sounds. For example, another portion of the sound 308 travels along a reflection signal path 314, where the sound is reflected by the wall 310 to the user 302. The reflection signal path 314 may result in an attenuation, filtering, and time delay of the sound 308 caused by the propagation medium for the distance between the object 304 and the wall 310, another attenuation or filtering caused by a reflection off the wall 310, and another attenuation, filtering, and time delay caused by the propagation medium for the distance between the wall 310 and the user 302. The amount of the attenuation at the wall 310 depends on the acoustic absorption of the wall 310, which can vary based on the material of the wall 310. In another example, another portion of the sound 308 travels along a reflection signal path 316, where it is reflected by an object 324 and to the user 302. Although the paths 314 and 316 are examples of $1^{st}$ order reflections caused by reflection at a single surface, a room impulse response may incorporate effects from higher order reflections at multiple surfaces or objects. By transforming an audio signal of the object 304 using the room impulse response, the output audio for the user 302 of the headset 110 simulates propagation of the audio signal as sound through the room 300 along the direct and reflection signal paths.

In some embodiments, multiple sound sources within the room 300 may be used to generate measured room impulse responses for multiple locations within the room 300. For example, the object 318 may include a speaker that generates a sound 330 using a reference audio signal that is measured by a microphone at the headset 110. The headset 110 determines a measured room impulse response by deconvolving the received sound 330 with the reference audio signal. The received sound 330 represents the sound 330 after propagation within the room, such as along a direct signal path 320 and reflection signal path 322 off the wall 326. Similarly, the object 304 may be a sound source that generates the sound 308 which is captured by the microphone at the headset 110 and used to determine another measured room impulse response. In some embodiments, multiple measured room impulse responses may be combined to generate an overall measured room impulse response for the room. A measured room impulse response may be used to update a room impulse response retrieved from the room impulse response database 212, or as a room parameter to retrieve a room impulse response from the room impulse response database 212.

Figure 4:
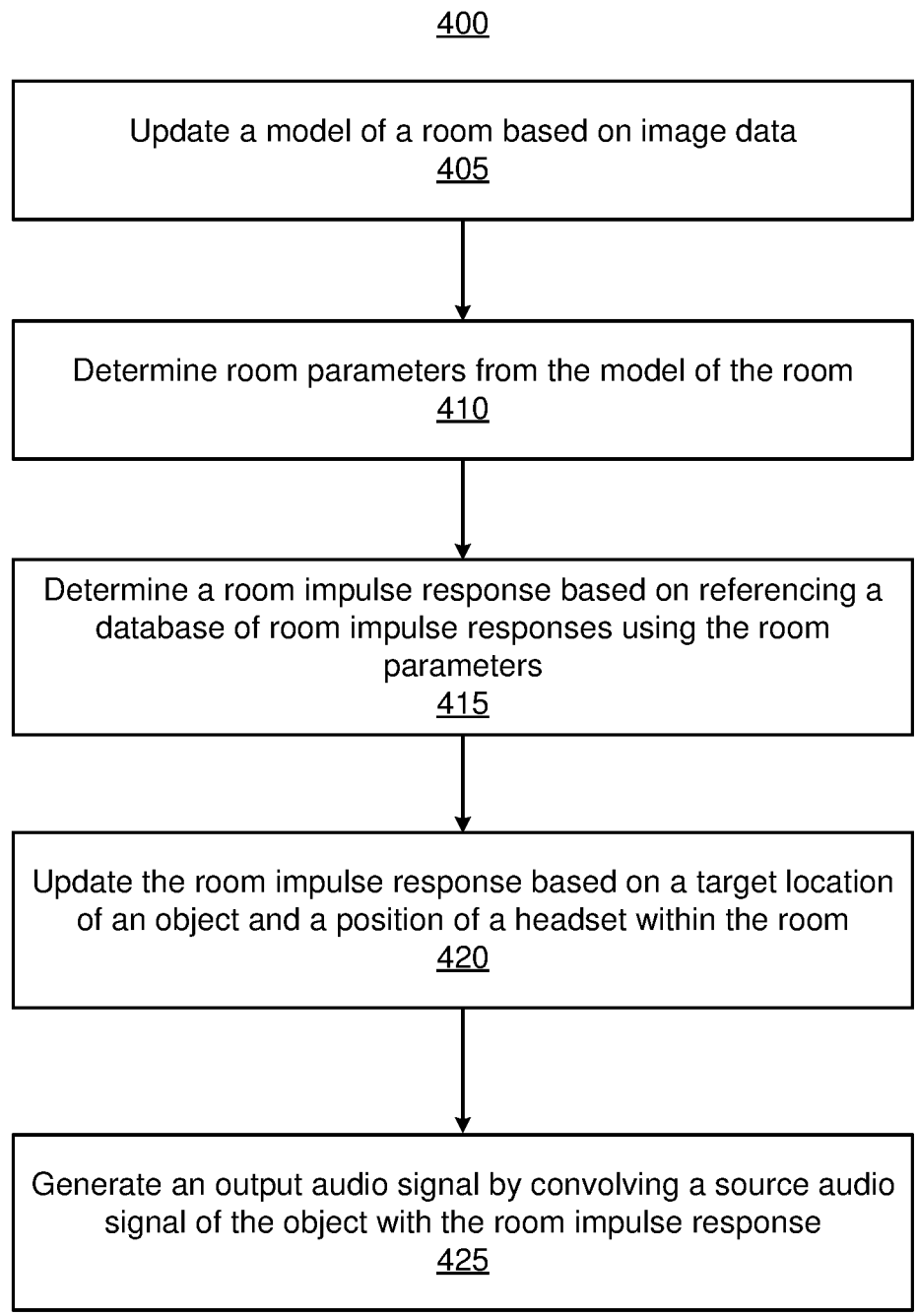
FIG. 4 is a flow chart of a method for generating an output audio signal using a room impulse response, according to some embodiments.

FIG. 4 is a flow chart of a method 400 for generating an output audio signal using a room impulse response, according to some embodiments. The method 400 may be performed by processing circuitry of the audio processing system 130. The headset 110 provides a virtual reality environment to the user. An object may also be located in the room, such as an actual object or a virtual object. The method 400 creates a virtual sound source that is perceived by the listener as propagating within the room from the source location of the object to the position of the user. The method 400 may include fewer or additional steps, and steps may be performed in different orders.

The audio processing system 130 (e.g., room modeling module 210) updates 405 a model of a room based on image data. The model of the room defines physical properties of the room. The headset 110 or other computing device (e.g., a console) captures the image data, which is received by the room modeling module 210. The image data may include depth image data captured by a DCA and color image data captured by a PCA of the headset 110.

The model may include one or more surfaces. The surfaces may include multiple walls, a floor, and a ceiling for a rectangular shaped room. The model is not necessarily limited to a rectangular shaped room, and may include other shapes of rooms and corresponding surfaces. The surfaces of the room define the dimensions of the room or the volume of the room. The model of the room may also include one or more materials. For example, materials may be associated with the surfaces of the room. In some embodiments, the model of the room may further include objects, and materials associated with the objects.

The surfaces and dimensions of the room may be determined based on depth image data. For example, multiple frames of the depth image data may be captured by the DCA over time and combined to generate the model of the room. The materials of the room may be determined based on color image data. For example, the PCA may capture the color image data in connection with the DCA capturing the depth image data. Frames of the color image data and depth image data may be provided to a neural network trained to recognize the material associated with surfaces or objects captured in the frames.

The audio processing system 130 (e.g., room modeling module 210) determines 410 room parameters of the room based on the model of the room. The room parameters may include the dimensions of the room and the materials of the room that may be extracted from the model. Other room parameters may additionally or alternatively be used such as room type, or objects located in the room.

The room type and objects located in the room may also be determined based on the image data. For example, a neural network may be trained to recognize objects from the color image data and depth image data. In another example, a neural network may associate room types with dimensions and the materials from the model of the room. In some embodiments, objects in the room may also be used as input to determine the room type.

The audio processing system 130 (e.g., acoustic analysis module 214) determines 415 a room impulse response based on referencing a database of room impulse responses using the room parameters. For example, the room impulse response database 212 may be implemented by a storage device to store a listing of reference rooms. For each reference room, the room impulse response database 212 associates a room impulse response with room parameters such as dimensions, material, room type, or object. The room impulse response database 212 receives as input the room parameters, and returns a matching or closest matching room impulse response. A room impulse response may be selected from the database 212 based on closest match to room parameters. In some embodiments, different room parameters may be assigned different weights, with the closest match being selected based on the weighting of room parameters.

In some embodiments, the audio processing system 130 may determine a measured room impulse response from a sound source located in the room, and the measured room impulse response may be used as a room parameter to reference the room impulse response database 212. For example, the reference room with a closest matching room impulse response may be selected. In another example, a measured room impulse response may be used to update the room impulse response stored in the room impulse response database 212 for a reference room. In some embodiments, the audio processing system 130 determines room parameters based on other sensor data captured by the headset 110, such as audio data. The audio data may include ambient sounds and noise, or an actively emitted signal. In one example, the audio data may be used to determine a material or an acoustic absorption.

The audio processing system 130 (e.g., audio rendering module 220) updates 420 the room impulse response based on a target location of an object and a position of the headset within the room. If the room impulse response retrieved from the database is defined for a single source and receiver relationship, then the room impulse response is updated for other source or receiver locations. The position of the headset 110 may include a location and head pose of the listener, and these parameters may be tracked over time by the headset 110 as the user moves within the room. The object may be an actual object that is in the room at the target location, or a virtual object that is virtually positioned at the target location.

In some embodiments, the room impulse response retrieved from the database 212 includes a direct sound portion, an early reflection portion, and a late reverberation portion. Updating the room impulse response for the target location of the object and position of the headset may include updating each of these room impulse response portions. For the direct sound portion, the direct sound path direction and intensity can be calculated from the relative source and receiver positions independent of the room. The direct sound portion is adjusted by using an HRTF for the appropriate direction. The late reverberation portion is also independent of the positions of the source and receiver in the room. The early reflections portion may be stored in the room impulse response database 212 such that their path from the source to the receiver, including all reflections with surfaces, was known. These paths, and hence the reflection timing and amplitude could then be updated to account for the target location of the object and the position of the headset. The early reflection portion may be adjusted using an HRTF for each early reflection direction. The late reverberation portion may be adjusted by manipulating frequency dependent parameters of the reverberator. In some embodiments, other acoustic parameters such as reverberation time or direct to reverberant ratio may be adjusted.

The audio processing system 130 (e.g., audio rendering module 220) generates 425 an output audio signal by convolving a source audio signal of the object with the room impulse response. The source audio signal represents the audio signal at the object prior to propagation as sound within the room. In some embodiments, the source audio signal is a mono audio signal that is convolved with a binaural room impulse response into left and right output channels. For example, an adjusted room impulse response for the left ear may be applied to the source audio signal to generate the left output channel, and the adjusted room impulse response for the right ear may be applied to the source audio signal to generate the right output channel. The left output channel may be provided to a left speaker and the right output channel may be provided to a right speaker of the headset 110.

Figure 5:
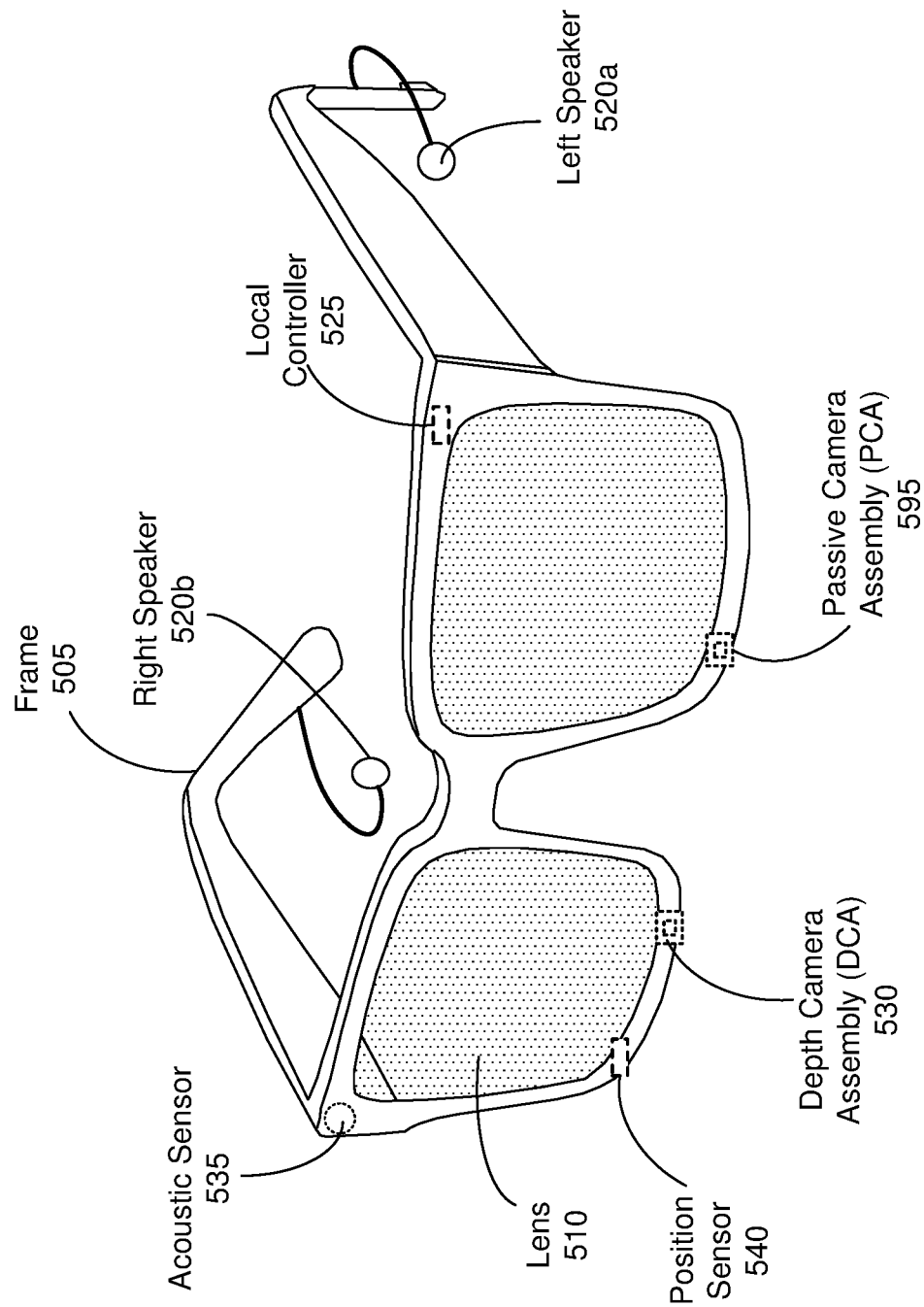
FIG. 5 is an example diagram of a headset, according to some embodiments.

FIG. 5 is an example diagram of the headset 110, according to some embodiments. The headset 110 presents media to a user. In one embodiment, the headset 110 may be a near-eye display (NED). In another embodiment, the headset 110 may be a head-mounted display (HMD). In general, the headset may be worn on the face of a user such that content (e.g., media content) is presented using one or both lens 510 of the headset 110. However, the headset 110 may also be used such that media content is presented to a user in a different manner. Examples of media content presented by the headset 110 include one or more images, video, audio, or some combination thereof. The headset 110 may include, among other components, a frame 505, a lens 510, a left speaker 520a, a right speaker 520b, a DCA 530, a PCA 595, an acoustic sensor 535, a position sensor 540, and a local controller 525. While FIG. 5 illustrates the components of the headset 110 in example locations on the headset 110, the components may be located elsewhere on the headset 110, on a peripheral device paired with the headset 110, or some combination thereof.

The headset 110 may correct or enhance the vision of a user, protect the eye of a user, or provide images to a user. The headset 110 may be eyeglasses which correct for defects in a user's eyesight. The headset 110 may be sunglasses which protect a user's eye from the sun. The headset 110 may be safety glasses which protect a user's eye from impact. The headset 110 may be a night vision device or infrared goggles to enhance a user's vision at night. The headset 110 may be a near-eye display that produces artificial reality content for the user. Alternatively, the headset 110 may not include a lens 510 and may be a frame 505 with an audio system that provides audio content (e.g., music, radio, podcasts) to a user.

The frame 505 holds the other components of the headset 110. A left audio channel generated by the audio processing system 130 may be provided to the left speaker 520a, and a right audio channel generated by the audio processing system 130 may be provided to the right speaker 520b. Although the speakers 520a and 520b are shown exterior to the frame 505, the speakers 520a and 520b may be enclosed in the frame 505.

The lens 510 provides or transmits light to a user wearing the headset 110. The lens 510 may be prescription lens (e.g., single vision, bifocal and trifocal, or progressive) to help correct for defects in a user's eyesight. The prescription lens transmits ambient light to the user wearing the headset 110. The transmitted ambient light may be altered by the prescription lens to correct for defects in the user's eyesight. The lens 510 may be a polarized lens or a tinted lens to protect the user's eyes from the sun. The lens 510 may be one or more waveguides as part of a waveguide display in which image light is coupled through an end or edge of the waveguide to the eye of the user. The lens 510 may include an electronic display for providing image light and may also include an optics block for magnifying image light from the electronic display.

The DCA 530 captures depth image data describing depth information for a local area surrounding the headset 110, such as a room. In some embodiments, the DCA 530 may include a light projector (e.g., structured light and/or flash illumination for time-of-flight), an imaging device, and a controller. The captured data may be images captured by the imaging device of light projected onto the local area by the light projector. In one embodiment, the DCA may include two or more cameras that are oriented to capture portions of the local area in stereo and a controller. The captured data may be images captured by the two or more cameras of the local area in stereo. The controller computes the depth information of the local area using the captured data and depth determination techniques (e.g., structured light, time-of-flight, stereo imaging, etc.). Based on the depth information, the controller 525 determines absolute positional information of the headset 110 within the local area. The controller 525 may also generate a model of the area, such as a room. The DCA 530 may be integrated with the headset 110 or may be positioned within the local area external to the headset 110. In the latter embodiment, the controller of the DCA 530 may transmit the depth image data to the controller 525 of the headset 110. In addition, the position sensor 540 generates one or more measurement signals in response to motion of the headset 110. The position sensor 540 may be located on a portion of the frame 505 of the headset 110.

The position sensor 540 may include a position sensor, an inertial measurement unit (IMU), or both. Some embodiments of the headset 110 may or may not include the position sensor 540 or may include more than one position sensors 540. In embodiments in which the position sensor 540 includes an IMU, the IMU generates IMU data based on measurement signals from the position sensor 540. Examples of position sensor 540 include: one or more accelerometers, one or more gyroscopes, one or more magnetometers, another suitable type of sensor that detects motion, a type of sensor used for error correction of the IMU, or some combination thereof. The position sensor 540 may be located external to the IMU, internal to the IMU, or some combination thereof.

Based on the one or more measurement signals, the position sensor 540 estimates a current position of the headset 110 relative to an initial position of the headset 110. The estimated position may include a location of the headset 110 and/or an orientation of the headset 110 or the user's head wearing the headset 110, or some combination thereof. The orientation may correspond to a position of each ear relative to a reference point. In some embodiments, the position sensor 540 uses the depth information and/or the absolute positional information from a DCA 530 to estimate the current position of the headset 110. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 110 from the sampled data. For example, the IMU integrates the measurement signals received from the accelerometers over time to estimate a velocity vector and integrates the velocity vector over time to determine an estimated position of a reference point on the headset 110. The reference point is a point that may be used to describe the position of the headset 110. While the reference point may generally be defined as a point in space, however, in practice the reference point is defined as a point within the headset 110.

The PCA 595 includes one or more passive cameras that generate color (e.g., RGB) image data. Unlike the DCA 530 that uses active light emission and reflection, the PCA 595 captures light from the environment of a local area to generate image data. Rather than pixel values defining depth or distance from the imaging device, the pixel values of the image data may define the visible color of objects captured in the imaging data. In some embodiments, the controller 525 generates the image data based on light captured by the passive imaging device.

The acoustic sensor 535 records sounds, such as in connection with determination of measured room impulse responses. In some embodiments, the acoustic sensor 534 includes a microphone array with multiple acoustic detection locations that are positioned on the headset 110.

Figure 6:
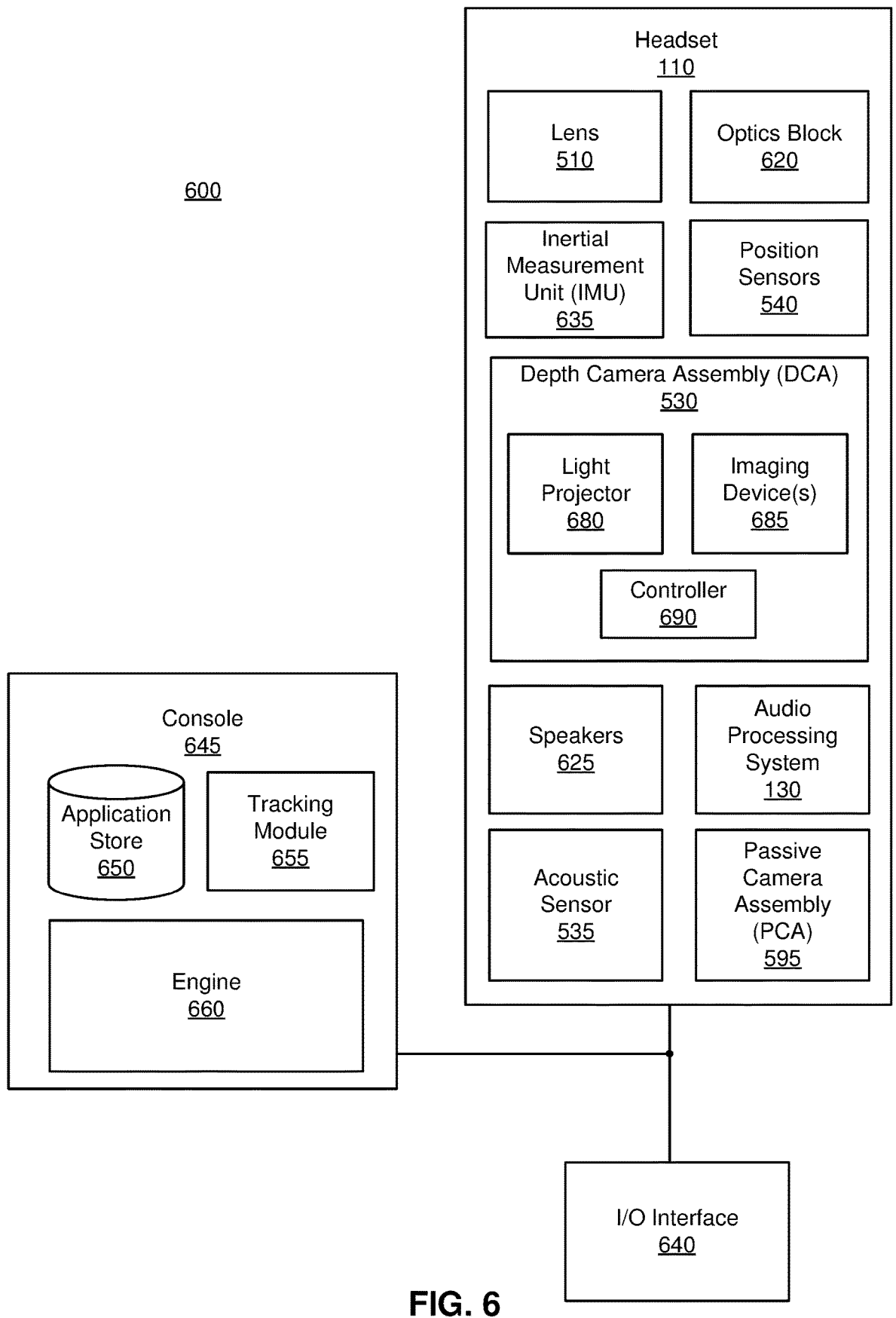
FIG. 6 is a block diagram of a system environment including a headset, according to some embodiments.

FIG. 6 is a block diagram of a system environment including a headset 110, according to some embodiments. The system 600 may operate in a virtual reality (VR), an augmented reality (AR), a mixed reality (MR), or some combination thereof. The system 600 includes a headset 110 and an input/output (I/O) interface 640 that is coupled to a console 645. While FIG. 6 shows an example system 600 including one headset 110 and one I/O interface 640, in other embodiments any number of these components may be included in the system 100. For example, there may be multiple headsets 110 each having an associated I/O interface 640, with each headset 110 and I/O interface 640 communicating with the console 645. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 645 may be provided by the headset 110. In another example, some or all of the functionality of the headset 110 may be provided by the console 645.

The headset 110 includes a lens 510, an optics block 620, one or more position sensors 540, a depth camera assembly (DCA) 530, an inertial measurement unit (IMU) 635, a passive camera assembly (PCA) 595, the speakers 625, the audio processing system 130, and the acoustic sensor 535. Some embodiments of headset 110 have different components than those described in conjunction with FIG. 6. Additionally, the functionality provided by various components described in conjunction with FIG. 6 may be differently distributed among the components of the headset 110 in other embodiments, or be captured in separate assemblies remote from the headset 110.

The lens 510 may include an electronic display that displays 2D or 3D images to the user in accordance with data received from the console 645. In various embodiments, the lens 510 comprises a single electronic display or multiple electronic displays (e.g., a display for each eye of a user). Examples of an electronic display include: a liquid crystal display (LCD), an organic light emitting diode (OLED) display, an active-matrix organic light-emitting diode display (AMOLED), some other display, or some combination thereof.

The optics block 620 magnifies image light received from the electronic display, corrects optical errors associated with the image light, and presents the corrected image light to a user of the headset 110. In various embodiments, the optics block 620 includes one or more optical elements. Example optical elements included in the optics block 620 include: an aperture, a Fresnel lens, a convex lens, a concave lens, a filter, a reflecting surface, or any other suitable optical element that affects image light. Moreover, the optics block 620 may include combinations of different optical elements. In some embodiments, one or more of the optical elements in the optics block 620 may have one or more coatings, such as partially reflective or anti-reflective coatings.

Magnification and focusing of the image light by the optics block 620 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 620 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 820 corrects the distortion when it receives image light from the electronic display generated based on the content.

The IMU 635 is an electronic device that generates data indicating a position of the headset 110 based on measurement signals received from one or more of the position sensors 540. A position sensor 540 generates one or more measurement signals in response to motion of the headset 110. Examples of position sensors 540 include: one or more accelerometers, one or more gyroscopes, one or more magnetometers, another suitable type of sensor that detects motion, a type of sensor used for error correction of the IMU 635, or some combination thereof. The position sensors 540 may be located external to the IMU 635, internal to the IMU 635, or some combination thereof.

The DCA 530 generates depth image data of a local area, such as a room. Depth image data includes pixel values defining distance from the imaging device, and thus provides a (e.g., 3D) mapping of locations captured in the depth image data. The DCA 530 includes a light projector 680, one or more imaging devices 685, and a controller 690. The light projector 680 may project a structured light pattern or other light that is reflected off objects in the local area, and captured by the imaging device 685 to generate the depth image data.

For example, the light projector 680 may project a plurality of structured light (SL) elements of different types (e.g. lines, grids, or dots) onto a portion of a local area surrounding the headset 110. In various embodiments, the light projector 680 comprises an emitter and a pattern plate. The emitter is configured to illuminate the pattern plate with light (e.g., infrared light). The illuminated pattern plate projects a SL pattern comprising a plurality of SL elements into the local area. For example, each of the SL elements projected by the illuminated pattern plate is a dot associated with a particular location on the pattern plate.

Each SL element projected by the DCA 530 comprises light in the infrared light part of the electromagnetic spectrum. In some embodiments, the illumination source is a laser configured to illuminate a pattern plate with infrared light such that it is invisible to a human. In some embodiments, the illumination source may be pulsed. In some embodiments, the illumination source may be visible and pulsed such that the light is not visible to the eye.

The SL pattern projected into the local area by the DCA 630 deforms as it encounters various surfaces and objects in the local area. The one or more imaging devices 685 are each configured to capture one or more images of the local area. Each of the one or more images captured may include a plurality of SL elements (e.g., dots) projected by the light projector 680 and reflected by the objects in the local area. Each of the one or more imaging devices 685 may be a detector array, a camera, or a video camera.

The controller 690 generates the depth image data based on light captured by the imaging device 685. The controller 690 may further provide the depth image data to the console 645, the audio processing system 130, or some other component.

The PCA 595 includes one or more passive cameras that generate color (e.g., RGB) image data. Unlike the DCA 530 that uses active light emission and reflection, the PCA 595 captures light from the environment of a local area to generate image data. Rather than pixel values defining depth or distance from the imaging device, the pixel values of the image data may define the visible color of objects captured in the imaging data. In some embodiments, the PCA 595 includes a controller that generates the color image data based on light captured by the passive imaging device. In some embodiments, the DCA 530 and the PCA 595 share a controller, such as the local controller 525 shown in FIG. 5. For example, the controller 525 may map each of the one or more images captured in the visible spectrum (e.g., image data) and in the infrared spectrum (e.g., depth image data) to each other. In one or more embodiments, the controller 525 is configured to, additionally or alternatively, provide the one or more images of the local area to the audio processing system 130 or console 645.

The audio processing system 130 determines the room impulse response of a room, and adjusts audio signals associated with objects using the room impulse response. The output audio signal generated by the audio processing system 130 is provided to the speakers 625, which may include the left speaker 520a and right speaker 520b. Various components of the audio processing system 130 may be located in the headset 110, or elsewhere such as in the console 645 or a remote system. In one example, image data capture and determination of room parameters are performed at the headset 110, using the model to reference a database for acoustic parameters is performed in a remote system, and using the acoustic parameters to modify a source audio signal for an object is performed by the headset 110. In some embodiments, updating the model of the room or determination of the room parameters may also be performed by a remote system.

The acoustic sensor 535 may be used to receive audio inputs from the user of the headset, or to measure room impulse responses. In some embodiments, a speaker 625 generates sound using a reference audio signal to facilitate determination of a measured room impulse response or other measured acoustic parameters by another headset 110 or other device. In some embodiments, the acoustic sensor 535 includes a microphone array to facilitate directional time of arrival estimation for received audio signals. The directional time of arrival estimation may be used to generate measured room impulse responses or other measured acoustic parameters.

The I/O interface 640 is a device that allows a user to send action requests and receive responses from the console 645. An action request is a request to perform a particular action. For example, an action request may be an instruction to start or end capture of image or video data, or an instruction to perform a particular action within an application. The I/O interface 640 may include one or more input devices. Example input devices include: a keyboard, a mouse, a game controller, or any other suitable device for receiving action requests and communicating the action requests to the console 645. An action request received by the I/O interface 640 is communicated to the console 645, which performs an action corresponding to the action request. In some embodiments, the I/O interface 640 includes the IMU 635, as further described above, that captures calibration data indicating an estimated position of the I/O interface 640 relative to an initial position of the I/O interface 640. In some embodiments, the I/O interface 640 may provide haptic feedback to the user in accordance with instructions received from the console 645. For example, haptic feedback is provided when an action request is received, or the console 645 communicates instructions to the I/O interface 640 causing the I/O interface 640 to generate haptic feedback when the console 645 performs an action.

The console 645 provides content to the headset 110 for processing in accordance with information received from one or more of: the DCA 530, the PCA 595, the headset 110, and the I/O interface 640. In the example shown in FIG. 6, the console 645 includes an application store 650, a tracking module 655, and an engine 660. Some embodiments of the console 645 have different modules or components than those described in conjunction with FIG. 6. Similarly, the functions further described below may be distributed among components of the console 645 in a different manner than described in conjunction with FIG. 6. In some embodiments, the functionality discussed herein with respect to the console 645 may be implemented in the headset 110, or a remote system.

The application store 650 stores one or more applications for execution by the console 645. An application is a group of instructions, that when executed by a processor, generates content for presentation to the user. Content generated by an application may be in response to inputs received from the user via movement of the headset 110 or the I/O interface 640. Examples of applications include: gaming applications, conferencing applications, video playback applications, or other suitable applications.

The tracking module 655 calibrates the local area of the system 600 using one or more calibration parameters and may adjust one or more calibration parameters to reduce error in determination of the position of the headset 110 or of the I/O interface 640. For example, the tracking module 655 communicates a calibration parameter to the DCA 530 to adjust the focus of the DCA 530 to more accurately determine positions of SL elements captured by the DCA 530. Calibration performed by the tracking module 655 also accounts for information received from the IMU 635 in the headset 110 and/or an IMU 635 included in the I/O interface 640. Additionally, if tracking of the headset 110 is lost (e.g., the DCA 530 loses line of sight of at least a threshold number of the projected SL elements), the tracking module 655 may re-calibrate some or all of the system 600.

The tracking module 655 tracks movements of the headset 110 or of the I/O interface 640 using information from the DCA 530, the PCA 595, the one or more position sensors 540, the IMU 635 or some combination thereof. For example, the tracking module 655 determines a position of a reference point of the headset 110 in a mapping of a local area based on information from the headset 110. The tracking module 655 may also determine positions of an object or virtual object. Additionally, in some embodiments, the tracking module 655 may use portions of data indicating a position of the headset 110 from the IMU 635 as well as representations of the local area from the DCA 530 to predict a future location of the headset 110. The tracking module 655 provides the estimated or predicted future position of the headset 110 or the I/O interface 640 to the engine 660.

The engine 660 executes applications and receives position information, acceleration information, velocity information, predicted future positions, or some combination thereof, of the headset 110 from the tracking module 655. Based on the received information, the engine 660 determines content to provide to the headset 110 for presentation to the user. For example, if the received information indicates that the user has looked to the left, the engine 660 generates content for the headset 110 that mirrors the user's movement in a virtual local area or in a local area augmenting the local area with additional content. Additionally, the engine 660 performs an action within an application executing on the console 645 in response to an action request received from the I/O interface 640 and provides feedback to the user that the action was performed. The provided feedback may be visual or audible feedback via the headset 110 or haptic feedback via the I/O interface 640.

Figure 7:
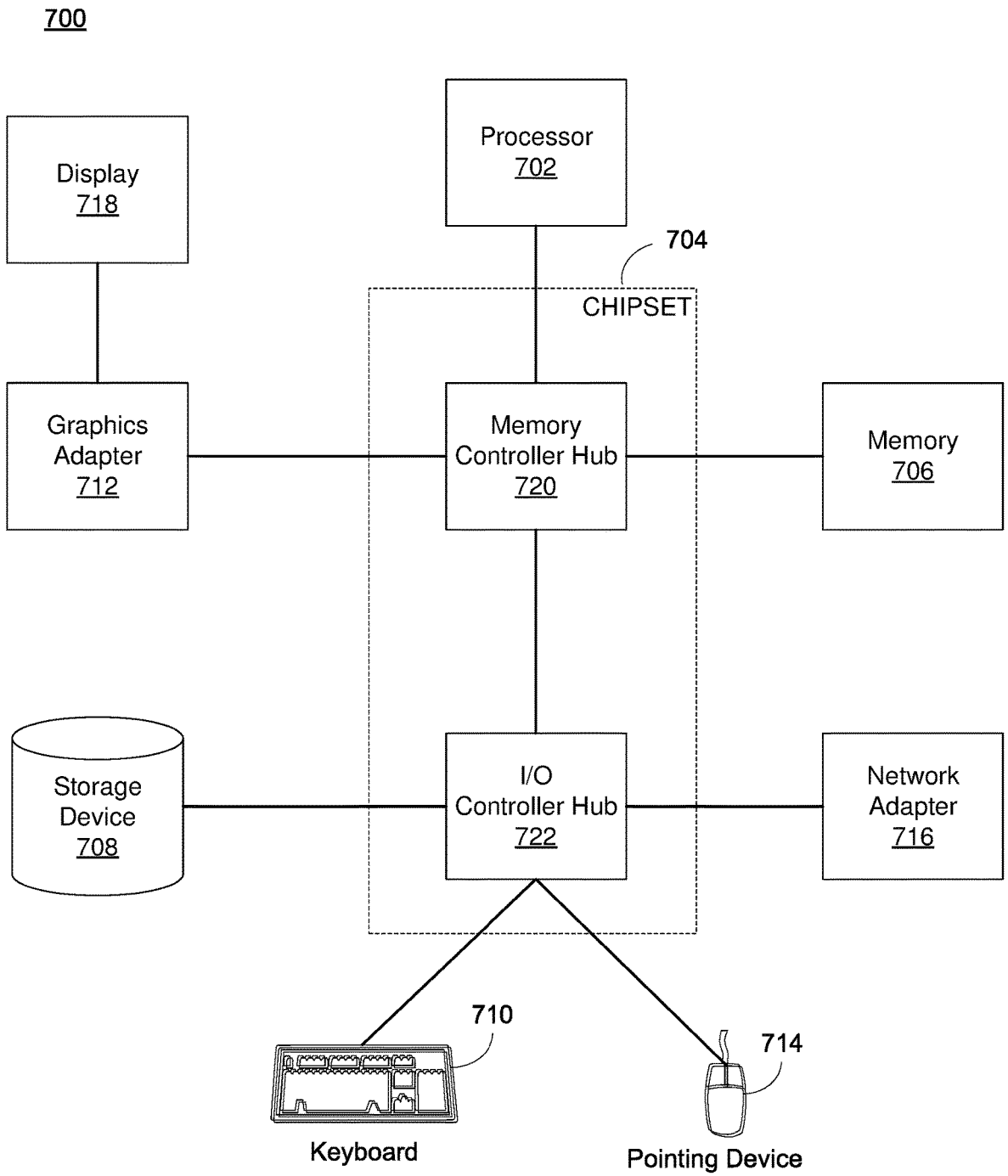
FIG. 7 is a high-level block diagram illustrating physical components of a computer, according to some embodiments.

FIG. 7 is a high-level block diagram illustrating physical components of a computer 700, according to some embodiments. The computing components discussed herein such as the audio processing system 130, the headset 110, or the console 645 may be implemented on the computer 700. Illustrated are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. For example, the memory 706 may store instructions that when executed by the processor 702 causes or configures the processor 702 to perform the methods discussed herein, such as the method 400. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer system 700 to a network. Some embodiments of the computer 700 have different and/or other components than those shown in FIG. 7. For example, the computer system 700 may be a server that lacks a display device, keyboard, and other components.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
    a depth camera assembly (DCA) configured to generate depth image data of a room;
    a camera configured to generate color image data of the room; and
    processing circuitry configured to:
        determine dimensions of the room based on the depth image data;
        identify a material of the room based in part on the color image data;
        determine a room type of the room based on the dimensions and the material of the room;
        determine a room impulse response for the room based on referencing a database of room impulses responses using the dimensions of the room, the material of the room, and the room type of the room, each room impulse response in the database being associated with dimensions of a reference room, a material included in the reference room, and a room type of the reference room; and
        generate an output audio signal by convolving a source audio signal of an object with the room impulse response.

2. The headset of claim 1, further comprising a storage device configured to store the database of room impulse responses.

3. The headset of claim 1, wherein:
    each room impulse response in the database is further associated with
    an object located in the reference room; and
    the processing circuitry configured to determine the room impulse response includes the processing circuitry being configured to reference the database of room impulse responses using an object located in the room.

4. The headset of claim 1, wherein the room type of the room includes one of:
    a conference room;
    a bathroom;
    a hallway;
    an office;
    a bedroom;
    a dining room; and
    a living room.

5. The headset of claim 1, wherein the processing circuitry configured to determine the room type includes the processing circuitry being configured to
apply the material and the dimensions of the room to a neural network model defining relationships between materials and dimensions of rooms as inputs and room types as output.

6. The headset of claim 1, wherein the processing circuitry is further configured to:
determine a measured room impulse response for a sound source in the room; and
determine the room impulse response for the room based in part on referencing the database of room impulse responses using the measured room impulse response.

7. The headset of claim 1, wherein the processing circuitry is further configured to generate a model of the room based on the depth image data, the model including at least one surface defining the dimensions of the room.

8. The headset of claim 1, wherein:
the room impulse response from the database defines a single source to receiver relationship; and
the processing circuitry is further configured to update the room impulse response from the database based on a target location of the object and a position of the headset within the room.

9. The headset of claim 8, wherein the processing configured to update the room impulse response from the database based on the target location of the object and the position of the headset within the room includes the processing circuitry being configured to adjust at least one of:
a direction and amplitude of direct sound from the target location of the object to the position of the headset;
a direction and amplitude of a reflection sound from the target location of the object to the position of the headset;
a reverberation time from the target location of the object to the position of the headset; and
a direct to reverberant ratio from the target location of the object to the position of the headset.

10. A method performed by a processing circuitry, the method comprising:
determining dimensions of a room based on depth image data from a depth camera assembly (DCA) of a headset;
identifying a material of the room based on color image data from a camera of the headset;
determining a room type of the room based on the dimensions and the material of the room;
determining a room impulse response for the room based on referencing a database of room impulse responses using the dimensions of the room, the material of the room, and the room type of the room, each room impulse response in the database being associated with dimensions of a reference room, a material included in the reference room, and a room type of the reference room; and
generating an output audio signal by convolving a source audio signal of an object with the room impulse response.

11. The method of claim 10, further comprising storing the database of room impulse responses in a storage device.

12. The method of claim 10, wherein:
each room impulse response in the database is further associated with
an object located in the reference room; and
determining the room impulse response includes reference the database of room impulse responses using an object located in the room.

13. The method of claim 10, wherein determining the room type includes
applying the material and the dimensions of the room to a neural network model defining relationships between materials and dimensions of rooms as inputs and room types as output.

14. The method of claim 10, further comprising, by the processing circuitry:
determining a measured room impulse response for a sound source in the room; and
determining the room impulse response for the room based in part on referencing the database of room impulse responses using the measured room impulse response.

15. A system, comprising:
a headset, including:
a depth camera assembly (DCA) configured to generate depth image data of a room;
a camera configured to generate color image data of the room; and
processing circuitry configured to:
determine dimensions of the room based on the depth image data;
identify a material of the room based on the color image data;
determine a room type of the room based on the dimensions and the material of the room;
determine a room impulse response for the room based on referencing a database of room impulses responses using the dimensions of the room, the material of the room, and the room type of the room; and
generate an output audio signal by convolving a source audio signal of an object with the room impulse response; and
a storage device configured to store the database of room impulse responses, each of the room impulse responses associated with room parameters defining properties of a reference room within the database, the properties of each reference room including dimensions of the reference room, a material included in the reference room, and a room type of the reference room.

16. The system of claim 15, wherein the storage device is a remote server separate from the headset.

* * * * *